United States Patent
Ryu et al.

(10) Patent No.: US 9,238,418 B2
(45) Date of Patent: Jan. 19, 2016

(54) METHOD AND SYSTEM FOR CONTROLLING POWER OF FUEL CELL VEHICLE

(71) Applicants: Hyundai Motor Company, Seoul (KR); Korea Advanced Institute of Science and Technology, Daejeon (KR)

(72) Inventors: Seongpil Ryu, Busan (KR); Sang Uk Kwon, Suwon-si (KR); Kyuil Lee, Yongin-si (KR); Seo Ho Choi, Seoul (KR); Jihun Han, Daejeon (KR); Youngjin Park, Daejeon (KR)

(73) Assignees: HYUNDAI MOTOR COMPANY, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/054,607

(22) Filed: Oct. 15, 2013

(65) Prior Publication Data

US 2014/0288737 A1   Sep. 25, 2014

(30) Foreign Application Priority Data

Mar. 19, 2013   (KR) .................. 10-2013-0029328

(51) Int. Cl.
- *B60L 11/18* (2006.01)
- *B60L 3/12* (2006.01)
- *H01M 8/00* (2006.01)

(52) U.S. Cl.
CPC .............. *B60L 11/1881* (2013.01); *B60L 3/12* (2013.01); *B60L 11/1861* (2013.01); *B60L 11/1887* (2013.01); *H01M 8/00* (2013.01); *B60L 2240/622* (2013.01); *B60L 2250/12* (2013.01); *B60L 2260/52* (2013.01); *B60L 2260/54* (2013.01); *Y02T 10/7005* (2013.01)

(58) Field of Classification Search
CPC ............ B60L 11/1881; B60L 11/1861; B60L 11/1887; B60L 3/12; B60L 2260/52; B60L 2250/12; B60L 2240/622; B60L 2260/54; H01M 8/00; Y02T 10/7005
See application file for complete search history.

(56) References Cited

U.S. PATENT DOCUMENTS 5,832,396 A * 11/1998 Moroto et al. .................. 701/22
8,602,141 B2 * 12/2013 Yee et al. .................... 180/65.21

FOREIGN PATENT DOCUMENTS

| JP | 2001-314040 A | 11/2001 |
| JP | 2007126145 A | 5/2007 |

* cited by examiner

*Primary Examiner* — John Q Nguyen
*Assistant Examiner* — Alan D Hutchinson
(74) *Attorney, Agent, or Firm* — McDermott Will & Emery LLP

(57) ABSTRACT

A method of controlling power of the fuel cell vehicle includes dividing an expected driving path of the fuel cell vehicle into a plurality of sections and setting the plurality of sections according to a gradient, and comparing whether a predicted battery state of charge variation is within a battery charging/discharging allowance range for each of the plurality of divided sections The method further includes comparing predicted power with a predetermined maximum allowance power for each of the plurality of divided sections, and setting the plurality of divided sections as a battery charging/discharging prohibition section and a battery charging/discharging allowance section in advance according to a result of the comparison of the predicted battery state of charge variation and the predicted power.

7 Claims, 5 Drawing Sheets

FIG. 3
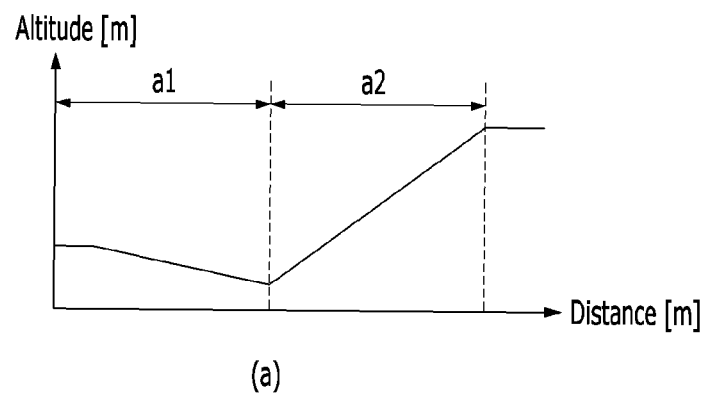
(a)
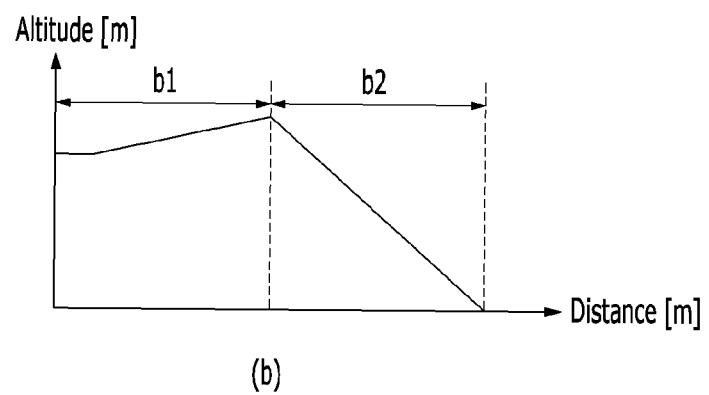
(b)

FIG. 4
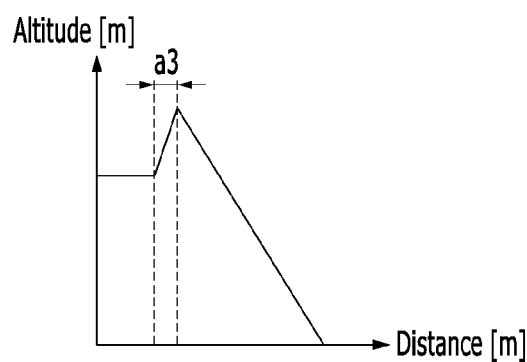
(a)
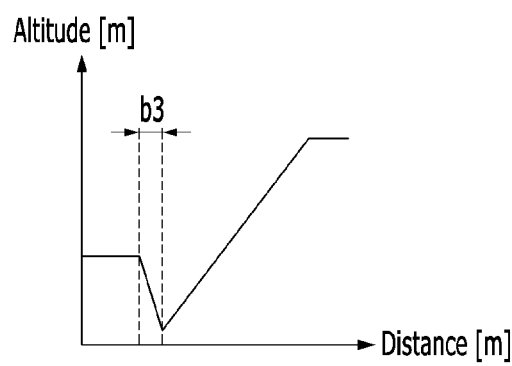
(b)

METHOD AND SYSTEM FOR CONTROLLING POWER OF FUEL CELL VEHICLE

CROSS-REFERENCE TO RELATED APPLICATION

This application claims priority to and the benefit of Korean Patent Application No. 10-2013-0029328 filed in the Korean Intellectual Property Office on Mar. 19, 2013, the entire contents of which are incorporated herein by reference.

TECHNICAL FIELD

The present disclosure relates to a method and a system for controlling power of a fuel cell vehicle, and more particularly, to such a method and a system, which divide an expected driving path of a vehicle according to a gradient into a plurality of sections and set the divided sections as a battery charging/discharging prohibition section and a battery charging/discharging allowance section in advance.

BACKGROUND

Demand of an environmentally-friendly vehicle has been increased due to demand of improvement of vehicle fuel efficiency of and reinforcement of exhaust gas regulations. In general, fuel cells generate electrical energy through oxidation-reduction reaction of hydrogen supplied from a hydrogen tank and oxygen supplied from external air.

A fuel cell vehicle is operated without using existing petroleum resources, thereby attracting attention as an environment-friendly vehicle.

The fuel cell vehicle controls charging/discharging of a battery based on a momentary driving situation for improvement of fuel efficiency.

However, the current fuel cell vehicle fails to optimally control power by reflecting a state of charge (SOC) of the battery and a driving path.

The above information disclosed in this Background section is only for enhancement of understanding of the background of the disclosure, and therefore may contain information that does not form the prior art that is already known to a person of ordinary skill in the art.

SUMMARY

The present disclosure provides a method and a system for controlling power of a fuel cell vehicle to efficiently control power by dividing an expected driving path of a vehicle into a plurality of sections according to a gradient and setting the divided sections as a battery charging/discharging prohibition section and a battery charging/discharging allowance section in advance.

A method of controlling charging/discharging of a fuel cell vehicle according to an exemplary embodiment of the present invention includes: dividing an expected driving path of a fuel cell vehicle into a plurality of sections and setting the plurality of sections according to a gradient; comparing whether a predicted battery state of charge variation is within a battery charging/discharging allowance range for each of the plurality of divided sections; comparing predicted power with predetermined maximum allowance power for each of the plurality of divided sections; and setting the plurality of divided sections as a battery charging/discharging prohibition section and a battery charging/discharging allowance section in advance according to a result of the comparison of the predicted battery state of charge variation and the predicted power.

The setting of the plurality of divided sections as the battery charging/discharging prohibition section and the battery charging/discharging allowance section in advance may include setting the plurality of divided sections as the battery charging/discharging prohibition section when the predicted battery state of charge variation is out of the battery charging/discharging allowance range.

The battery charging/discharging allowance range may be set by the equation below.

$$SOC_{min} - SOC_{current} \leq \Delta SOC_{Predicted} \leq SOC_{max} - SOC_{current}$$

Herein, $SOC_{min}$ is minimum battery state of charge, $SOC_{max}$ is maximum battery state of charge, and $SOC_{current}$ is current battery state of charge.

The comparing of the predicted power with the predetermined maximum allowance power may be performed when the predicted battery state of charge variation is within the battery charging/discharging allowance range.

The setting of the plurality of divided sections as the battery charging/discharging prohibition section and the battery charging/discharging allowance section in advance may include: setting the plurality of sections as the battery charging/discharging prohibition section when the predicted power is larger than the predetermined maximum allowance power; and setting the plurality of sections as the battery charging/discharging allowance section when the predicted power is smaller than the predetermined maximum allowance power.

The dividing of the expected driving path of the fuel cell vehicle into the plurality of sections and the setting of the plurality of sections according to the gradient may include: searching for the expected driving path based on a current position and a received destination of the fuel cell vehicle; and dividing the searched expected driving path into a plurality of sections and setting the plurality of sections according to a gradient.

A system for controlling power of a fuel cell vehicle according to another exemplary embodiment of the present invention includes: a navigator providing information on a driving path of the fuel cell vehicle; a battery; a fuel cell which triggers oxidation-reduction reaction of oxygen supplied from an air supplier and hydrogen supplied from a hydrogen tank to generate electrical energy; a motor driven by current applied from an inverter; and a power controller operated by a program set to control the battery, the fuel cell, and the motor based on information input through the navigator.

BRIEF DESCRIPTION OF THE DRAWINGS

FIG. 3 is a graph illustrating a battery charging/discharging allowance section according to the exemplary embodiment of the present invention.

FIG. 4 is a graph illustrating a battery charging/discharging prohibition section according to the exemplary embodiment of the present invention.

DETAILED DESCRIPTION

Hereinafter, the present disclosure will be made more fully hereinafter with reference to the accompanying drawings, in which exemplary embodiments are shown. As those skilled in the art would realize, the described embodiments may be modified in various different ways, without departing from the spirit or scope of the present disclosure.

Throughout the specification, unless explicitly described to the contrary, the word "comprise" and variations such as "comprises" or "comprising," will be understood to imply the inclusion of stated elements but not the exclusion of any other elements.

Figure 1:
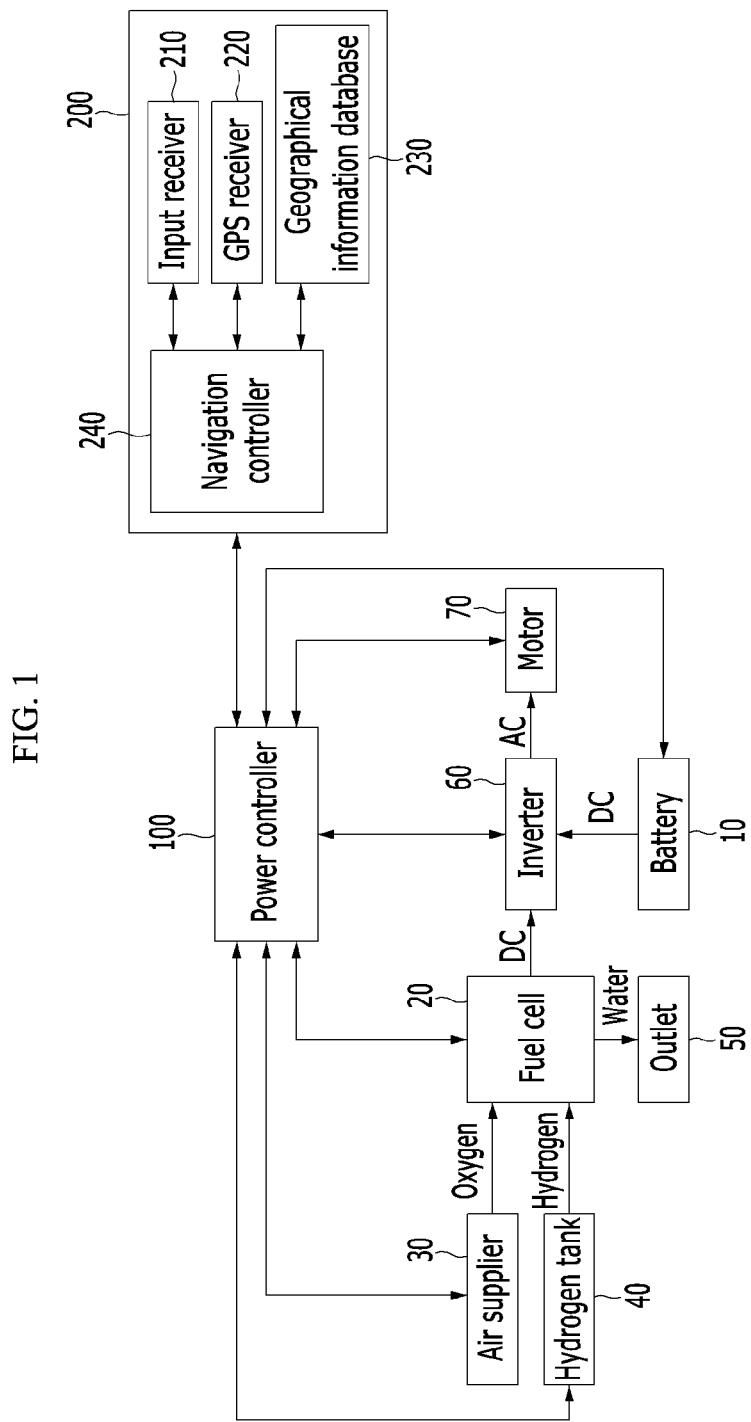
FIG. 1 is a block diagram illustrating a power control system of a fuel cell vehicle according to an exemplary embodiment of the present invention.

FIG. 1 is a block diagram illustrating a power control system of a fuel cell vehicle according to an exemplary embodiment of the present invention.

Referring to FIG. 1, a power control system of a fuel cell vehicle includes a battery 10, a fuel cell 20 for triggering oxidation-reduction reaction of oxygen and hydrogen and generating electrical energy, an air supplier 30 for supplying oxygen to the fuel cell, and a hydrogen tank 40 for supply hydrogen to the fuel cell. An outlet 50 discharges water generated in the fuel cell, an inverter 60 converts direct current to alternating current, and a motor 70 is driven by current applied from the inverter. A power controller (PCU) 100 divides an expected driving path of the vehicle into a plurality of sections according to a gradient to set the divided sections as a battery charging/discharging prohibition section and a battery charging/discharging allowance section in advance. The power controller further controls the battery 10, the fuel cell 20, and the motor 70, and a navigator 200.

The navigator 200 includes an input receiver 210 for receiving an input of a user, a GPS receiver 220 for receiving GPS position information from a plurality of satellites, a geographical information database 230 which is a storage space for road information, building information, and the like, and a navigation controller 240.

The navigation controller 240 generates information on a driving path of the fuel cell vehicle based on the information input from the input receiver 210, the GPS receiver 220, and the geographical information database 230 and provides the generated information to the power controller 100.

The power controller 100 is one or more microprocessors operated by a predetermined program or a hardware including the microprocessor. The predetermined program is comprised of a series of commands for performing a power control method of the fuel cell vehicle as described hereinafter.

In the exemplary embodiment of the present invention, the power controller 100 may include the navigation controller 240.

Figure 2:
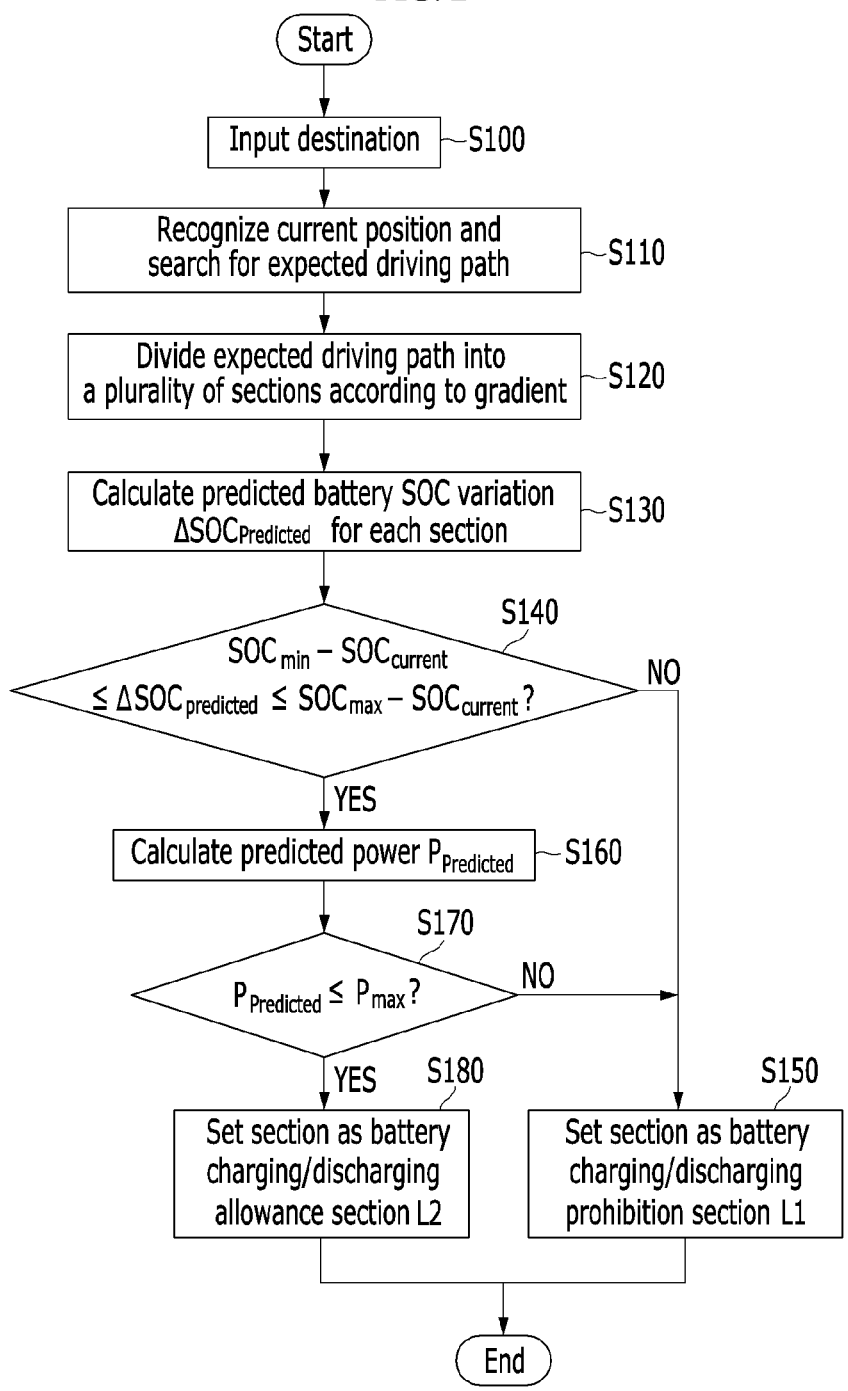
FIG. 2 is a flowchart of a power control method of the fuel cell vehicle according to the exemplary embodiment of the present invention.

FIG. 2 is a flowchart of a power control method of the fuel cell vehicle according to the exemplary embodiment of the present invention.

Referring to FIG. 2, the input receiver 210 first receives an input of a destination from a user (S100). Then, the navigation controller 240 recognizes a current position of the fuel cell vehicle, and searches for an expected driving path based on the input destination (S110).

The power controller 100 divides the searched predicted driving path into a plurality of sections according to gradient set to the plurality of sections (S120).

The power controller 100 calculates a predicted battery SOC variation $\Delta SOC_{Predicted}$ for each of the plurality of divided sections (S130).

The predicted battery SOC variation $\Delta SOC_{Predicted}$ is calculated by Equation 1 below based on a battery internal resistance model (equivalent circuit model). Here, $E_{potential}$ (mg$\Delta$h), $Q_0$, $V_{oc}$, and $SOC_{set}$ sequentially indicate potential energy, capacity of the battery 10, voltage of an open circuit of the battery 10, and a predetermined battery SOC.

$$\Delta SOC_{Predicted} = \frac{E_{Potential}}{Q_0 V_{OC}(SOC_{set})} = \frac{mg\Delta h}{Q_0 V_{OC}(SOC_{set})} \quad \text{Equation 1}$$

The battery SOC is set to be within a battery chargeable/dischargeable range considering efficiency and durability of the battery 10 by Equation 2 below.

$$SOC_{min} \leq SOC \leq SOC_{max} \quad \text{Equation 2}$$

By Equation 3 below, the battery charging/discharging allowance range may be set based on the current battery state of charge $SOC_{current}$.

$$SOC_{min} - SOC_{current} \leq \Delta SOC_{Predicted} \leq SOC_{max} - SOC_{current} \quad \text{Equation 3}$$

Step S130 determines whether to set a battery charging/discharging prohibition section L1 by comparing whether the predicted battery state of charge variation $\Delta SOC_{Predicted}$ is within the set battery charging/discharging allowance range (S140).

If the predicted battery state of charge variation $\Delta SOC_{Predicted}$ is out of the set battery charging/discharging allowance range, the power controller 100 sets the plurality of section as the battery charging/discharging prohibition section L1 (S150). When the predicted battery state of charge variation $\Delta SOC_{Predicted}$ is within the battery charging/discharging allowance range, the power controller 100 determines whether the section is a battery charging/discharging allowance section L2 again.

The power controller 100 calculates predicted power $P_{Predicted}$ for each of the plurality of divided sections (S160).

The predicted power $P_{Predicted}$ is calculated by Equation 4 below. Here, $F_{Climb}$, $v_{Avg}$, m, g, and θ sequentially indicate power necessary for overcoming gradient resistance, an average speed, a mass of the vehicle, acceleration of gravity, and a gradient of a road.

$$P_{Predicted} = F_{Climb} \cdot v_{Avg} = m \cdot g \cdot \sin\theta \cdot v_{Avg} \quad \text{Equation 4}$$

After step S160 is completed, the power controller 100 determines whether to set the battery charging/discharging prohibition section L1 and the battery charging/discharging allowance section L2 in advance by comparing the predicted power $P_{Predicted}$ with predetermined maximum allowance power $P_{max}$ (S170).

When the predicted power $P_{Predicted}$ is larger than predetermined maximum allowance power $P_{max}$, the power controller 100 sets the section as the battery charging/discharging prohibition section L1 (S150).

When the predicted power $P_{Predicted}$ is smaller than predetermined maximum allowance power $P_{max}$, the power controller 100 sets the section as the battery charging/discharging allowance section L2 (S180).

Hereinafter, the method of controlling charging/discharging of the fuel cell vehicle will be described in more detail.

FIG. 3 is a graph illustrating the battery charging/discharging allowance section according to an exemplary embodiment of the present invention.

Referring to FIG. 3, section a1 and section b1 correspond to a case where the predicted battery SOC variation $\Delta SOC_{Predicted}$ is within the battery charging/discharging allowance range (S140). The predicted power $P_{Predicted}$ is smaller than the predetermined maximum allowance power $P_{max}$ (S170), so that power controller 100 sets the section as the battery charging/discharging allowance section L2 (S180).

The power controller 100 may charge the battery in section a1 before driving an uphill road (section a2). Similarly, the power controller 100 may discharge the battery in section b1 before driving a downhill road (section b2).

FIG. 4 is a graph illustrating the battery charging/discharging prohibition section according to an exemplary embodiment of the present invention.

Referring to FIG. 4, section a3 and section b3 correspond to a case where the predicted battery SOC variation $\Delta SOC_{Predicted}$ is within the battery charging/discharging allowance range (S140). However the predicted power $P_{Predicted}$ is larger than the predetermined maximum allowance power $P_{max}$ (S170), so that the power controller 100 sets the section as the battery charging/discharging prohibition section L1 (S150).

For example, if section a3, which is a steep uphill section, is set as the battery charging/discharging allowance section L2, the battery 10 requires large discharging current, thereby decreasing efficiency and a lifespan of the battery 10. If section b3, which is a steep downhill section, is set as the battery charging/discharging allowance section L2, the battery 10 may fail to be additionally charged due to an increase in the number of times of braking.

Accordingly, section a3 and section b3 are set as the battery charging/discharging prohibition section L1, so that the charging/discharging of the fuel cell vehicle is efficiently controlled.

Figure 5:
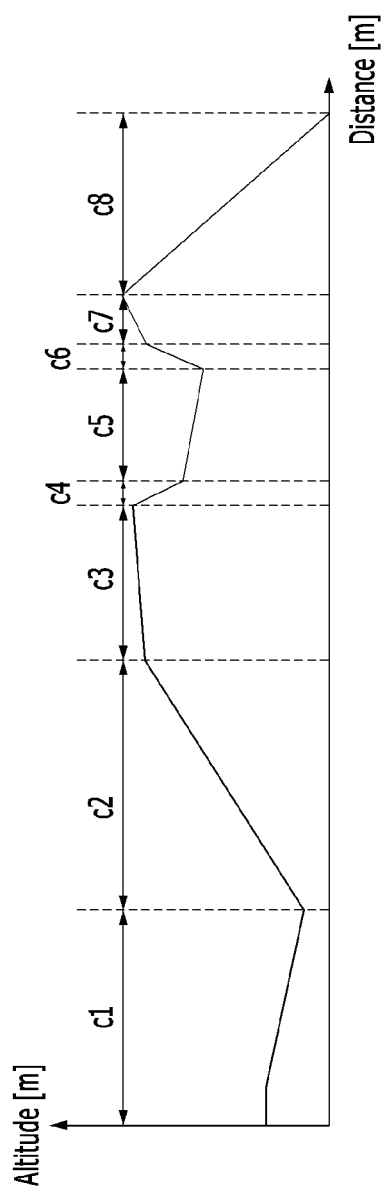
FIG. 5 is a graph illustrating an expected driving path divided into a plurality of sections according to a gradient according to the exemplary embodiment of the present invention.

FIG. 5 is a graph illustrating an expected driving path divided into a plurality of sections according to a gradient according to the exemplary embodiment of the present invention.

Referring to FIG. 5, the power controller 100 divides an expected driving path of the fuel cell vehicle into 8 sections according to a gradient and sets the divided 8 sections as the battery charging/discharging prohibition section L1 and the battery charging/discharging allowance section L2.

Section c2 in which an uphill road continues and section c8 in which a downhill section continues correspond to a case where the predicted battery state of charge variation $\Delta SOC_{Predicted}$ is out of the battery charging/discharging allowance range. Accordingly, before entering section c2 and c8, the battery 10 needs to be charged/discharged by setting the battery charging/discharging allowance section L2.

Section c4 is a steep downhill section, and section c6 is a steep uphill section. Sections c4 and c6 correspond to a case where the predicted power $P_{Predicted}$ is larger than the maximum allowance power $P_{max}$, and the sections are set as the battery charging/discharging prohibition section L1.

The power controller 100 may charge the battery 10 by an amount to be discharged in section c2 by setting section c1 as the battery charging/discharging allowance section L2. Similarly, the power controller 100 may discharge the battery 10 by an amount to be charged in section c8 by setting section c3, section c5 and set the section c7 as the battery charging/discharging allowance section L2.

As described above, the expected driving path of the vehicle into the plurality of sections can be divided according to the gradient, and the sections can be set as the battery charging/discharging prohibition section L1 and the battery charging/discharging allowance section L2 in advance.

Further, efficiency of the battery and lifespan of the battery can be improved by setting the battery charging/discharging prohibition section L1 and the battery charging/discharging allowance section L2 in advance.

As efficiency of the battery is improved, fuel efficiency of the fuel cell vehicle is improved.

While the disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling power of a fuel cell vehicle, comprising:
   dividing an expected driving path of the fuel cell vehicle into a plurality of sections and setting the plurality of sections according to a gradient;
   comparing whether a predicted battery state of charge variation is within a battery charging or discharging allowance range for each of the plurality of divided sections;
   obtaining a predicted power using vehicle based information;
   comparing the predicted power with maximum allowance power for each of the plurality of divided sections; and
   setting the plurality of divided sections as a battery charging or discharging prohibition section and a battery charging or discharging allowance section in advance according to a result of the comparison of the predicted battery state of charge variation and the predicted power.

2. The method of claim 1, wherein:
   the setting of the plurality of divided sections as the battery charging or discharging prohibition section and the battery charging or discharging allowance section in advance includes:
   setting the plurality of divided sections as the battery charging or discharging prohibition section when the predicted battery state of charge variation is out of the battery charging or discharging allowance range.

3. The method of claim 2, wherein:
   the battery charging or discharging allowance range is set by an equation below, and $$SOC_{min} - SOC_{current} \leq \Delta SOC_{predicted} \leq SOC_{max} - SOC_{current}$$

wherein, a $SOC_{min}$ is a minimum battery state of charge, a $SOC_{max}$ is a maximum battery state of charge, and a $SOC_{current}$ is a current battery state of charge.

4. The method of claim 2, wherein:
   the comparing of the predicted power with the maximum allowance power is performed when the predicted battery state of charge variation is within the battery charging or discharging allowance range.

5. The method of claim 4, wherein:
   the setting of the plurality of divided sections as the battery charging or discharging prohibition section and the battery charging or discharging allowance section in advance includes:
   setting the plurality of sections as the battery charging or discharging prohibition section when the predicted power is larger than the maximum allowance power; and setting the plurality of sections as the battery charging or discharging allowance section when the predicted power is smaller than the maximum allowance power.

6. The method of claim 1, wherein:

the dividing of the expected driving path of the fuel cell vehicle into the plurality of sections and the setting of the plurality of sections according to the gradient includes:

searching for the expected driving path based on a current position and a received destination of the fuel cell vehicle; and dividing the searched expected driving path into a plurality of sections and setting the plurality of sections according to a gradient.

7. A system for controlling power of a fuel cell vehicle, comprising:

a navigator configured to provide information on a driving path of the fuel cell vehicle;

a battery;

a fuel cell which triggers oxidation-reduction reaction of oxygen supplied from an air supplier and hydrogen supplied from a hydrogen tank to generate electrical energy;

a motor driven by current applied from an inverter; and a power controller operated by a program set to control the battery, the fuel cell, and the motor based on information input through the navigation system, wherein the predetermined program includes a series of commands for performing the method of any one of claims 1 to 6.

* * * * *